(12) United States Patent
Inui et al.

(10) Patent No.: US 6,970,949 B2
(45) Date of Patent: Nov. 29, 2005

(54) SYSTEM METHOD FOR REPLACING OLD DEVICE WITH NEW DEVICE IN A LAYERED STRUCTURE AND DETERMINING CONFIGURATION INFORMATION FOR LOWER LEVEL DEVICES ASSOCIATED WITH NEW DEVICE

(75) Inventors: Takashi Inui, Yokohama (JP); Noritoshi Yoshiyama, Yokohama (JP); Naoki Takahashi, Zama (JP); Takashi Yomo, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 10/402,558

(22) Filed: Mar. 28, 2003

(65) Prior Publication Data

US 2003/0204712 A1  Oct. 30, 2003

(30) Foreign Application Priority Data

Mar. 29, 2002 (JP) .............................. 2002-095191

(51) Int. Cl.⁷ .......................................... G06F 13/00
(52) U.S. Cl. .............................. 710/8; 710/10; 710/15; 710/16; 710/72; 710/62; 713/1; 713/2; 713/100; 714/4; 719/310; 719/315; 719/321
(58) Field of Search .............................. 710/8, 10, 15, 710/16, 72, 62; 713/1, 2, 100; 714/4; 719/310, 719/315, 321

(56) References Cited

U.S. PATENT DOCUMENTS

| | | | | |
|---|---|---|---|---|
| 4,604,690 A | * | 8/1986 | Crabtree et al. | 713/100 |
| 6,018,805 A | * | 1/2000 | Ma et al. | 714/4 |
| 6,041,364 A | * | 3/2000 | Lortz et al. | 719/321 |
| 6,052,750 A | * | 4/2000 | Lea | 710/72 |
| 6,065,068 A | * | 5/2000 | Foote | 710/13 |
| 6,282,646 B1 | * | 8/2001 | Hendry et al. | 713/100 |
| 6,425,079 B1 | * | 7/2002 | Mahmoud | 713/2 |
| 2003/0149756 A1 | * | 8/2003 | Grieve et al. | 709/223 |
| 2004/0083278 A1 | * | 4/2004 | Becherer | 709/221 |

* cited by examiner

Primary Examiner—Tammara Peyton
(74) Attorney, Agent, or Firm—Charlie Bustamante; Dillon & Yudell LLP

(57) ABSTRACT

A computer program or the like is provided for reducing changes to the setting information by the computer. A management apparatus is provided for managing devices connected to a computer using a layered structure including a managing section for setting information associated with each of the devices by recording it in a setting information database using a layered structure; an adding section, if an existing device has been replaced by a new device for adding the setting information for the new device into the setting information database; a condition deciding section to determine whether the existing device and the new device have a predetermined relationship; and a changing section, if the existing device and the new device have the predetermined relationship, for managing the setting information for a low level device, which is a device managed as a lower layer of the existing device, as the lower layer of setting information for the new device and recording it in the setting information database.

15 Claims, 14 Drawing Sheets

112

| DEVICE NAME | REVISION | ESTABLISHED VALUE |
|---|---|---|
| AGP CONTROLLER | B0 | DEVICE NAME = G BRIDGE<br>HARDWARE ID = 0x1F11<br>SERVICE = 0xABCD |
| AGP CONTROLLER | B1 | DEVICE NAME = G BRIDGE<br>HARDWARE ID = 0xAAAA<br>SERVICE = 0xBBBB |
| ⋮ | ⋮ | ⋮ |

| DEVICE NAME | RULE |
|---|---|
| AGP CONTROLLER | REVISION IS CHANGED FROM B0 TO B1, A LOWER LAYER IS SUCCEEDED |
| I/O CONTROLLER | REVISION IS IDEUTICAL, A LOWER LAYER IS SUCCEEDED |
| ⋮ | ⋮ |

FIG. 5

SYSTEM METHOD FOR REPLACING OLD DEVICE WITH NEW DEVICE IN A LAYERED STRUCTURE AND DETERMINING CONFIGURATION INFORMATION FOR LOWER LEVEL DEVICES ASSOCIATED WITH NEW DEVICE

BACKGROUND OF THE INVENTION

The present invention relates to a computer program, a management apparatus, a management method, a recording media, and a data recording media. Particularly, the present invention relates to a computer program, a management apparatus, a management method, a recording media, and a data recording media for managing information used to control the devices connected to a computer.

A method for managing the configuration setting information used to control a plurality of devices connected to a computer using a layered structure is used in the registry management of Microsoft's Windows (trademark of Microsoft Corporation, Redmond, Wash.) or the like.

In such a method, however, when an existing device managed as a higher layer of device would be changed with a new device, the setting information for a low level device managed as a lower layer of the existing device was discarded. Accordingly, this was inconvenient for users since it would be required to perform the resetting of the low level device even if only a higher layer of device would be changed.

Accordingly, a purpose of the present invention is to provide a computer program, a management apparatus, a management method, a recording media, and a data recording media which resolves the above problem. This may be achieved by combinations of the features described in the independent claims of the present application. Also, the dependent claims may prescribe further advantageous embodiments.

SUMMARY OF THE INVENTION

According to the first aspect of the present invention, a management apparatus is provided for managing devices connected to a computer using a layered structure, characterized by comprising: a managing means for managing setting information associated with each of the devices by recording it in a setting information database using the layered structure; an adding means, if an existing device is changed with a new device, for adding setting information for the new device to the setting information database; a condition deciding means for deciding whether or not the existing device and the new device have a predetermined relationship; and a changing means, if the existing device and the new device have the predetermined relationship, for managing a setting information for a low level device, which is a device managed as a lower layer of the existing device, as a lower layer of setting information for the new device and recording it in the setting information database. Also, a management method applicable to the management apparatus, a computer program for controlling them and a recording media for recording the computer program are provided.

Further, a management apparatus is provided for managing devices on a computer, characterized by comprising: a managing means for managing a setting information database maintaining setting information for an existing device; a setting information candidate managing means for previously managing the setting information for each of the plural devices in association with an identification information for the existing device; a deciding means for deciding whether or not the existing device has been changed with a new device; and a changing means, if the existing device would be decided to have been changed with the new device, for recording a setting information for the new device in the setting information database, on the basis of the setting information for the existing device and setting information provided by the setting information candidate managing means and associated with the new device. Also, a management method applicable to the management apparatus, a computer program for controlling them and a recording media for recording the computer program are provided.

Further, a management apparatus is provided which includes an adding means for adding and recording setting information used to control a device, if the device would be newly connected to a computer, characterized by comprising: a deciding means for deciding whether or not an existing device have been changed with a new device; a condition deciding means for deciding whether or not the existing device and the new device have a predetermined relationship; and a setting information addition controlling means, if the existing device and the new device have the predetermined relationship, for holding the setting information for the existing device as is without adding at least a portion of the setting information used to control the new device. Also, a management method applicable to the management apparatus, a computer program for controlling them and a recording media for recording the computer program are provided.

The above summary of the invention does not enumerate all of the necessary features for the present invention, but some combinations of these features may be also inventive features.

BRIEF DESCRIPTION OF THE DRAWINGS

Some of the purposes of the invention having been stated, others will appear as the description proceeds, when taken in connection with the accompanying drawings, in which:

FIG. 4 is an example of registry candidate information recorded on the registry candidate database 112;

FIG. 5 is an example of registry change rules recorded on the registry change rule database 142;

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
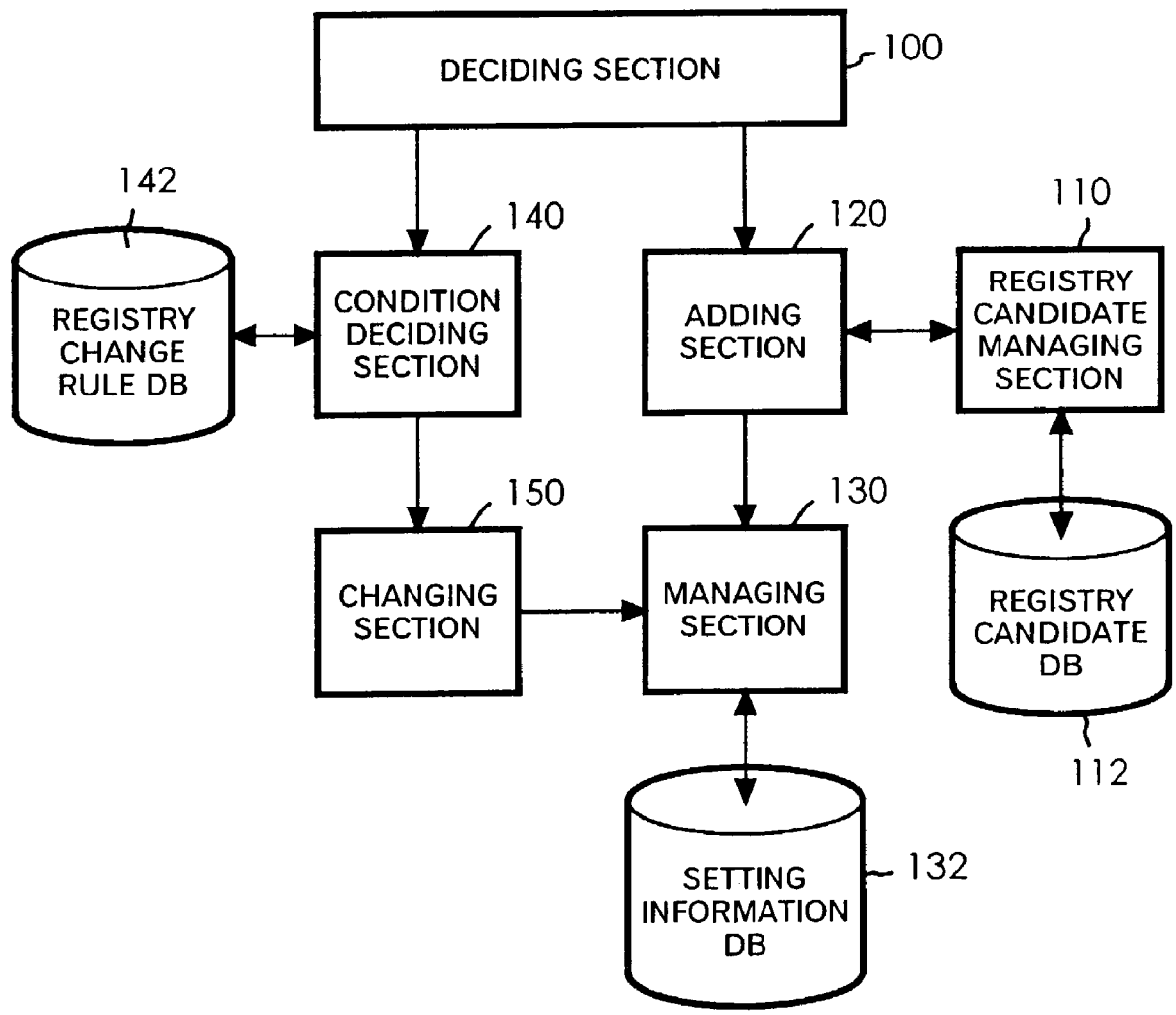
FIG. 1 is a functional block diagram of the management apparatus.

Referring now more particularly to the accompanying drawings, FIG. 1 is a functional block diagram of a management apparatus 10. The management apparatus 10 comprises a deciding section 100, a registry candidate managing section 110, a registry candidate database 112, an adding section 120, a managing section 130, a setting information database 132, a condition deciding section 140, a changing section 150, and a registry change rule database 142. Using a layered structure, the managing section 10 records in the setting information database 132 the registry information used when a plurality of devices connected to a computer are controlled by the operating system of the computer. Further, when an existing device is changed with a new device, the management apparatus 10 adds a registry information for this new device to the setting information database 132. At this time, if the existing device and the new device would be decided to have a predetermined relationship, the management apparatus 10 manages as a lower layer of the new device a low level device which is a device managed as a lower layer of the existing device to record it in the setting information database 132. As described above, without losing at least a part of information having been set for a low level device, the management apparatus 10 can set it as a lower layer of the new device.

The device is, for example, an LSI or a part of LSI function is connected to the central processing unit of a computer and controlling communications with the input/output device. As another example, the device may be a communication component or an input/output component connected to the central processing unit of a computer through an LSI.

Also, the registry information is an example of the setting information related to the present invention. For example, the registry information may be the registry of Microsoft's Windows (trademark) operating system. In the present embodiment, the registry information used when an operating system manages the devices will be described as the setting information, but the setting information related to the present invention should not be limited to the embodiment. For example, the management apparatus 10 may manage as the setting information the device information managed by the IBM's OS/2 (trademark of the IBM Corporation, Armonk, N.Y.) operating system or may manage a device control information which is managed by the Linux (trademark) operating system using the layered structure.

In the following, each section of the management apparatus 10 will be described.

The deciding section 100 decides whether or nor an existing device would have been changed with a new device. For example, the deciding section 100 decides whether or not the existing device would have been changed with the new device by periodically scanning the internal state of the management apparatus 10. Then, the deciding section 100 sends an identification information for the existing device to the condition deciding section 140 if the existing device would have been changed with the new device. Further, the deciding section 100 specifies identification information (a device ID, a revision ID or the like) for the new device which has previously been stored on the inside of the new device. Then, the deciding section 100 sends the identification information for the new device to the adding section 120 and the condition deciding section 140. In the present embodiment, the deciding section 100 detects and decides the changing of device by periodically scanning the internal state of the management apparatus 10, but the method of deciding the changing of device should not be limited to that of the embodiment. For example, by a contact sensor located in a position where the new device is mounted thereon, or in accordance with the user's input the deciding section 100 may decide that the device has been changed.

The registry candidate managing section 110 has previously managed as the registry information a registry information for a device possible to be newly connected to the management apparatus 10 associated with the identification information for the involved device. The registry candidate managing section 110 receives the identification information for the device from the adding section 120. Then, the registry candidate managing section 110 specifies the registry information stored in the registry candidate database 112 associated with the involved device and returns it to the registry candidate managing section 110. In this case, the registry candidate managing section 110 is an example of the setting information candidate managing section related to the present invention.

The adding section 120 receives the identification information for the new device from the deciding section 100. Then, the adding section 120 sends the identification information for the new device to the registry candidate managing section 110. Then, the adding section 120 receives the registry information associated with the new device from the registry candidate managing section 110. Then, the adding section 120 makes the managing section 130 add the registry information for the new device thereto by sending the registry information for this new device to the managing section 130.

The managing section 130 receives the registry information associated with the device from the adding section 120. Then, the managing section 130 manages this registry information by recording it in the setting information database 132 using the layered structure. Also, the managing section 130, when it receives a change command or direction for the registry information from the changing section 150, changes the registry information recorded in the setting information database 132 according to the direction.

The condition deciding section 140 receives the identification information for the existing device and the identification information for the new device from the deciding section 100, and decides whether or not the existing device and the new device would have a predetermined relationship previously defined, by referring to the registry change rule database 142. The condition deciding section 140, when it decides that the existing device and the new device have the predetermined relationship, send the low level device succession direction to the changing section 150 associated with the identification information for the existing and new devices. In the present embodiment, the condition deciding section 140, when it decides that the existing device and the new device can be considered as an identical device based on the rule recorded in the registry change rule database 142, sends the involved direction to the changing section 150.

The changing section 150 receives the low level device succession direction from the condition deciding section 140 associated with the identification information for the existing device and the new device. Then, the changing section 150 sends to the managing section 130 a change direction which is a direction of managing as a lower layer of registry information for the new device the registry information for a low level device which is a device managed as a lower layer of the existing device to record the registry information generated by this change in the setting information database 132.

As in the above, when the existing device is changed with the new device, the management apparatus 10 can succeed, at need, as the registry information in a lower layer of the new device the registry information for a device which has been managed as a lower layer of the existing device.

Figure 2:
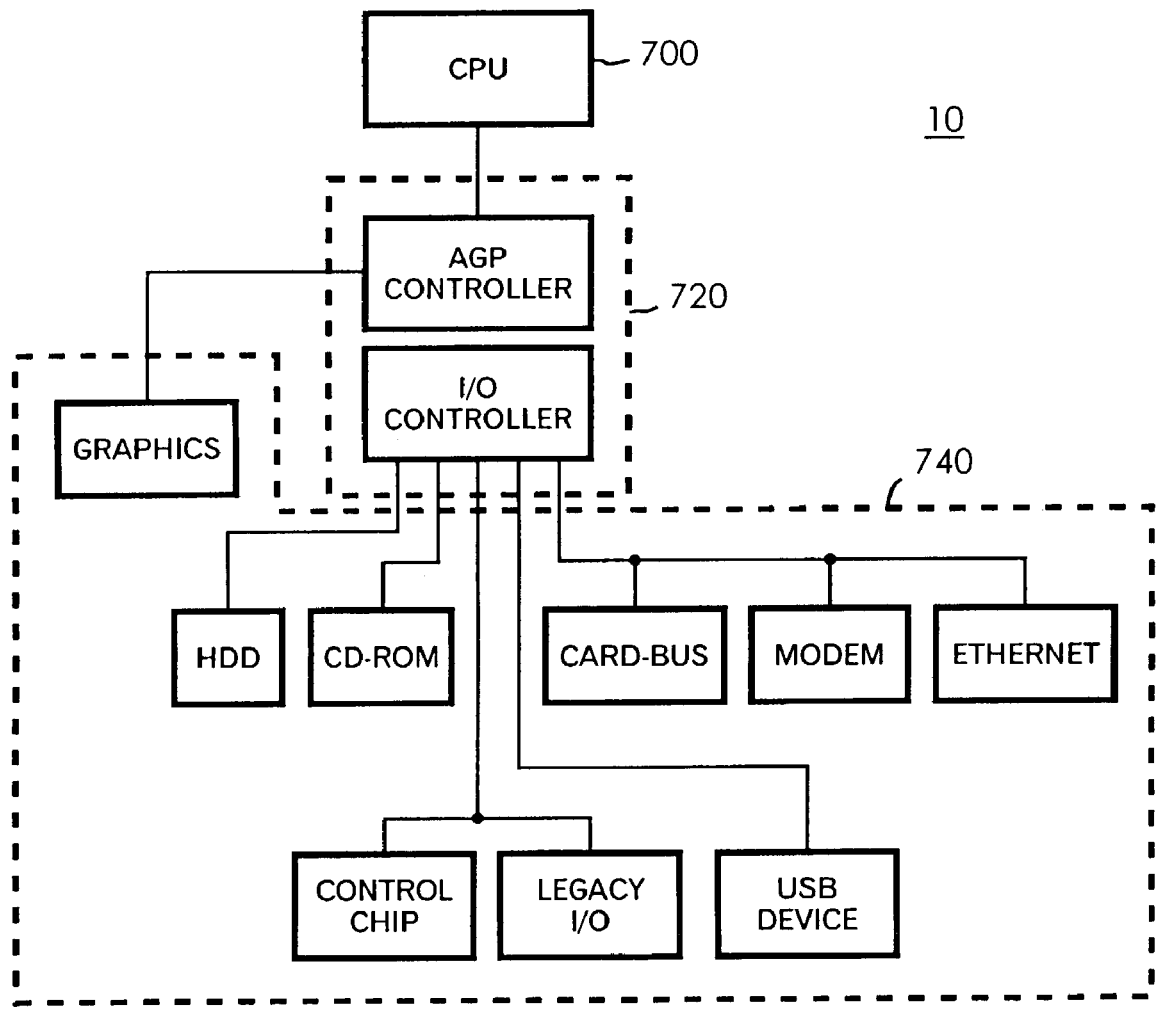
FIG. 2 is a schematic diagram of the hardware structure of the management apparatus of FIG. 1.

FIG. 2 shows an outline of the hardware configuration of the management apparatus 10. The management apparatus 10 comprises a CPU 700, a first layer of device group 720, and a second layer of device group 740. The first layer of device group 720 is an example of the existing device related to the present invention. Also, the second layer of device group 740 is an example of the low level device related to the present invention. Also, the first layer of device group 720 and the second layer of device group 740 are connected in the management apparatus 10 before a device is changed.

The first layer of device group 720 comprises an AGP controller and an I/O controller. The second layer of device group 740 comprises a graphics component, an HDD component, a CD-ROM component, a control chip, a legacy I/O component, a card-bus component, a modem component, a USB device component, and Ethernet component. The management apparatus 10 may be realized on the computer by the cooperation of a program executed on the CPU 700 and a hardware of the first layer of device group 720 and the second layer of device group 740.

The management apparatus 10 manages the setting information which is the information for controlling said chip and components, using the layered structure. For example, the second layer of device group 740 is connected to the CPU 700 through the first layer of device group 720, and the first layer of device group 720 is connected to the CPU 700 not through the second layer of device group 740. Accordingly, the management apparatus 10 manages the setting information for the first layer of device group 720 as a higher layer of setting information for the second layer of device group 740. By managing in such a manner, the management apparatus 10, when the setting or the like for one device is changed, can easily specify a low layer of device affected by the change of the setting or the like for the involved device and can perform necessary setting change.

As to the layered structure illustrated in the figure, a variety of examples may be conceivable. For example, the management apparatus 10 may refer to a device for controlling the bus as the high layer of device and a device connected to the bus as the low layer of device. For example, the management apparatus 10 may refer to a control chip of the PCI bus as the high layer of device and may refer to a device connected to the PCI bus as the low layer of device. Further, the management apparatus 10 may refer to a device controlling the communications of one interface as the high layer of device and may refer to a device connected to its interface as the low layer of device.

Figure 3:
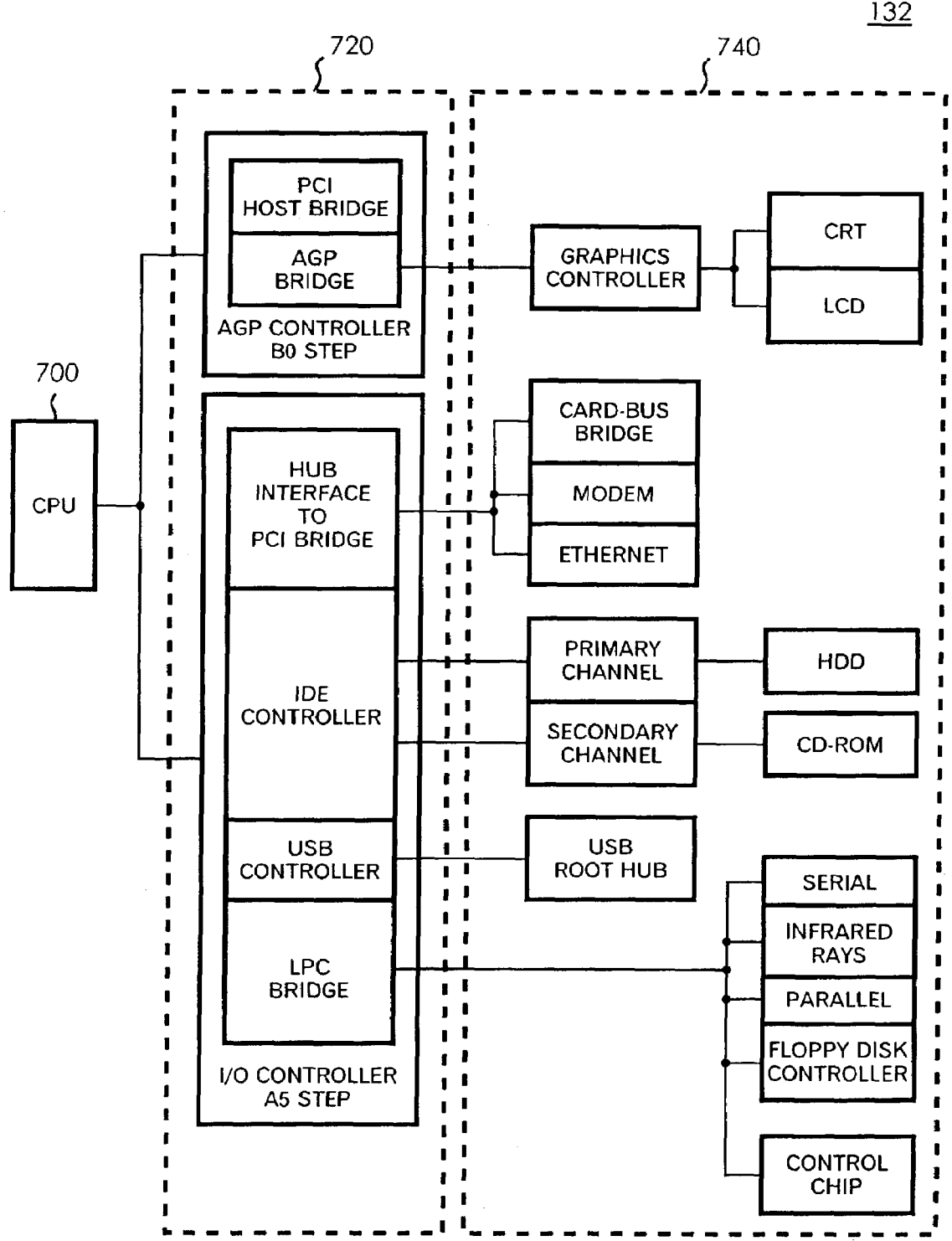
FIG. 3 is an example of registry information recorded on the setting information database 132 and managed in the layered structure.

FIG. 3 shows an example of registry information recorded in the setting information database 132 and managed by the layered structure. The setting information in the figure is an example of the setting information being set up in the hardware schematically illustrated in FIG. 2. The setting information database 132 has the registry information for the CPU 700, the registry information for the first layer of device group 720 and the registry information for the second layer of device group 740. The registry information for the first layer of device group 720 includes the registry information for the AGP controller and the registry information for the I/O controller. The registry information for the second layer of device group 740 includes registry information for the graphics controller, registry information for the card-bus bridge, registry information for the modem, the registry information for the Ethernet, registry information for the primary channel, registry information for the secondary channel, registry information for the USB root hub, registry information for the CRT, registry information for the LCD, registry information for the HDD, registry information for the CD-ROM, registry information for the serial device, registry information for the infrared ray device, registry information for the parallel device, registry information for the floppy disk controller, and registry information for the control chip.

The managing section 130 manages the registry information for the device in the first layer of device group 720 as a lower layer of registry information for the CPU 700, and further manages the registry information for the device in the secondary layer of device group 740 as a lower layer of registry information for the device in the first layer of device group 720. Accordingly, the management apparatus 10 can easily specify the registry information for the low level device affected by the modification of the registry information or the like for the high level device. For example, the managing section 130 manages the registry information for the graphics controller in the second layer of device group 740 as a lower layer of registry information for the AGP controller in the first layer of device group 720. Accordingly, the management apparatus 10 can decide easily that the registry information for the graphics controller is affected by the modification in the registry information for the AGP controller.

The first layer of device group 720 is an interface device for controlling the interface connecting the CPU 700 of the computer and the second layer of device group 740. Further, the second layer of device group 740 is a device connected to this interface. For example, the AGP bridge in the first layer of device group 720 is an example of the interface device. Further, the graphics controller in the second layer of device group 740 is an example of the device connected to this interface device.

FIG. 4 shows an example of the registry candidate recorded in the registry candidate database 112. The registry candidate database 112 includes a device name field, a revision field, and an established value field. The device name field stores the name of the kind of device. The revision field is identification information attached by a developer of the involved device in association with the modification or improvement repeatedly provided to the device. The established value field is information setup by the operating system as the initial value of the registry information, when a device specified by a combination of the device name and the revision is newly connected to the computer. The registry candidate database 112 stores as the established value an initial value of variable, for example, an information or the like that the device name is G Bridge.

As in the above, the registry database 112 previously manages the established value of the registry information for each of the plural devices in association with an identification information (for example, a combination of the device name and revision) for the involved device. Accordingly, the adding section 120 can specify the initial value of the registry information for the involved device on the basis of the identification information for the device by referring to the registry candidate database 112 and can add it to the setting information database 132.

FIG. 5 shows an example of registry change rule recorded in the registry change rule database 142. The registry change rule database 142 includes a device name field and a rule field. The device name field stores a name of the kind of device. The rule field stores a reference, on the basis of which the condition deciding section 140 decides that there is a predetermined relationship in each kind of devices. For example, when the existing AGP controller would be changed with a new AGP controller, the condition deciding section 140 would decide that there would be the predetermined relationship between the existing device and the new device if the revision of the existing device would be B0 and the revision of the new device would be B1. As mentioned above, the condition deciding section 140 makes a decision of whether or not the device name which is an information of the kind of device would be identical and a decision of whether or not the revision obeys a predetermined rule. Further, if it would be decided that the device name is identical and the revision obeys the predetermined rule, the changing section 150 can cause the setting information for the low level device to be managed as a lower layer of setting information for the new device and record it in the setting information database 132.

Also, when the revision number is different even if the primary portion of the identification information (for example, name, service, interface and so on) for the device would be identical, the deciding section 100 decides that the existing device has been changed with a new device. Then, according to this decision, the adding section 120 adds the registry information for the new device. On the other hand, the condition deciding section 140 can make a decision in accordance with the predetermined rule even if the revision number would be different, by referring to the registry change rule database 142 illustrated in the figure.

Figure 6:
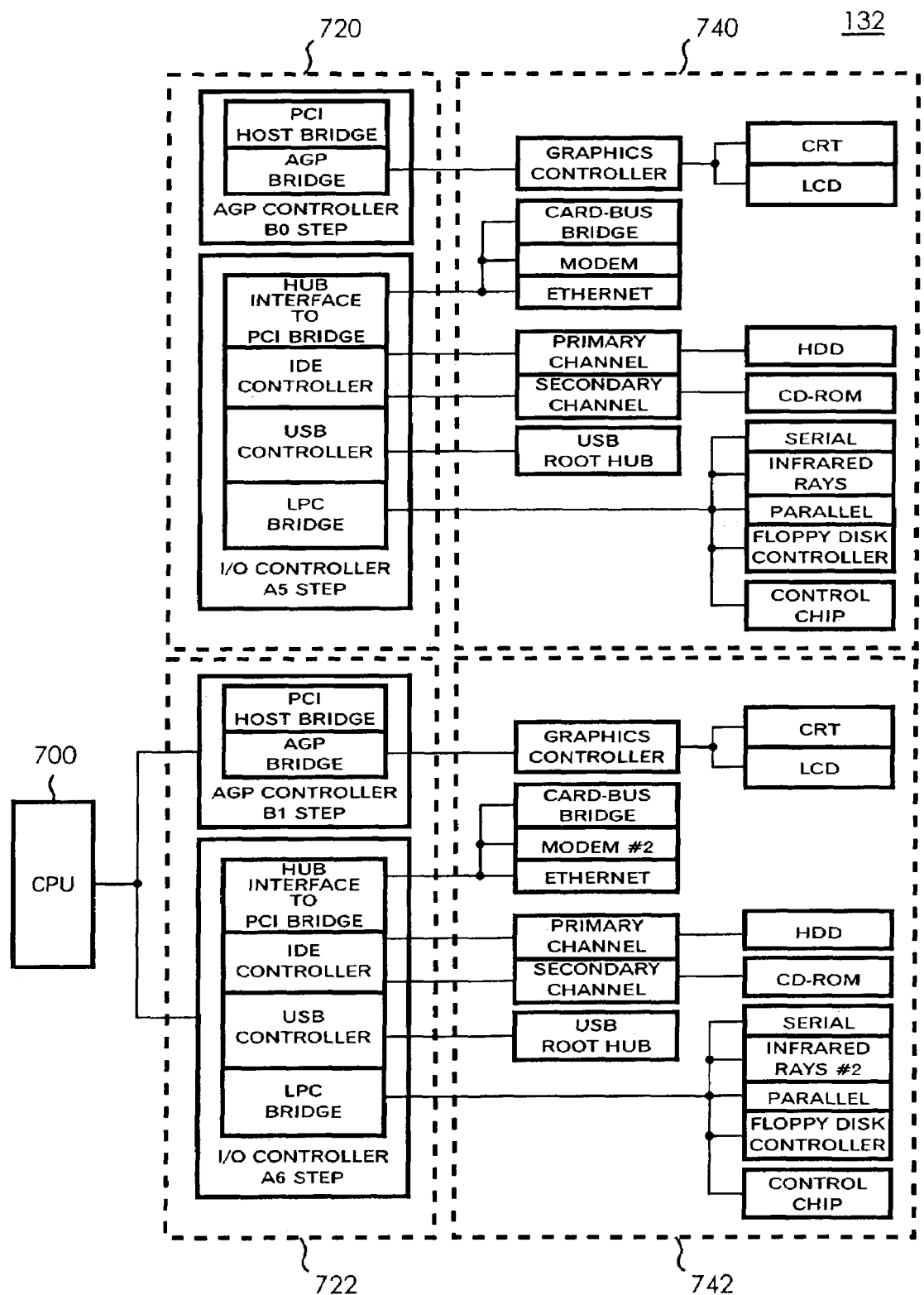
FIG. 6 is an example of registry information stored in the setting information database 132 after the registry information is added by the adding section 120.

FIG. 6 shows an example of registry information which the setting information database 132 stores after the registry information was added by the adding section 120. The figure shows an example of the setting information database 132 after the change of device as shown below was made in the management apparatus 10 having the hardware structure shown in FIG. 2. That is, it shows a case that the AGP controller and the I/O controller are replaced with a new AGP controller and a new I/O controller respectively and any devices managed as a lower layer of the both controllers have not been changed. In this case, the deciding section 100 makes a decision that the existing device (for example, the existing AGP controller and I/O controller) has been changed with a new device (for example, a new revision of AGP controller and I/O controller). That is, FIG. 6 shows a case that the registry information for the AGP controller (B1 step) and I/O controller (A6 step) is newly added to the setting information database 132 shown in FIG. 3.

The setting information database 132 has the CPU 700, the first layer of device group 720, the first layer of new device group 722, the second layer of device group 740, and the second layer of new device group 742. The descriptions of the first layer of device group 720 and the second layer of device group 740 shown in this figure are omitted since they are substantially same as those of the first layer of device group 720 and the second layer of device group 740 shown in FIG. 3. The first layer of new device group 722 shown in this figure is a structure in which the B0 step and the A5 step showing the revision of the first layer of device group 720 have been changed with the B1 step and the A6 step respectively. Also, the second layer of new device group 742 is a structure in which the modem component in the second layer of device group 740 has been changed with modem #2 component.

The setting information database 132 in this figure manages the registry information for the first layer of new device group 722, not the first layer of device group 720, as a lower layer of registry information for the CPU 700, different from the setting information database 132 in FIG. 3. Also, the setting information database 132 manages the registry information for the second layer of new device group 742 as a lower layer of registry information for the first layer of new device group 722. As stated above, if a device in the first layer of device group 720 would be changed with a new high level device like the first layer of new device 722, the adding section 120 would newly generate and add the second layer of new device group 742 without reusing the registry information for the second layer of device group 740 which have been managed as a low level device in the first layer of device group 720. At that time, if it would not be allowed by the specification prescribed by the operating system to use the same name as for devices having been placed in the setting information database 132, the involved device may become a new low level device with an identification number added to the device name. For example, the setting information database 132 manages the registry information as the modem #2 component instead of the modem component.

Figure 7:
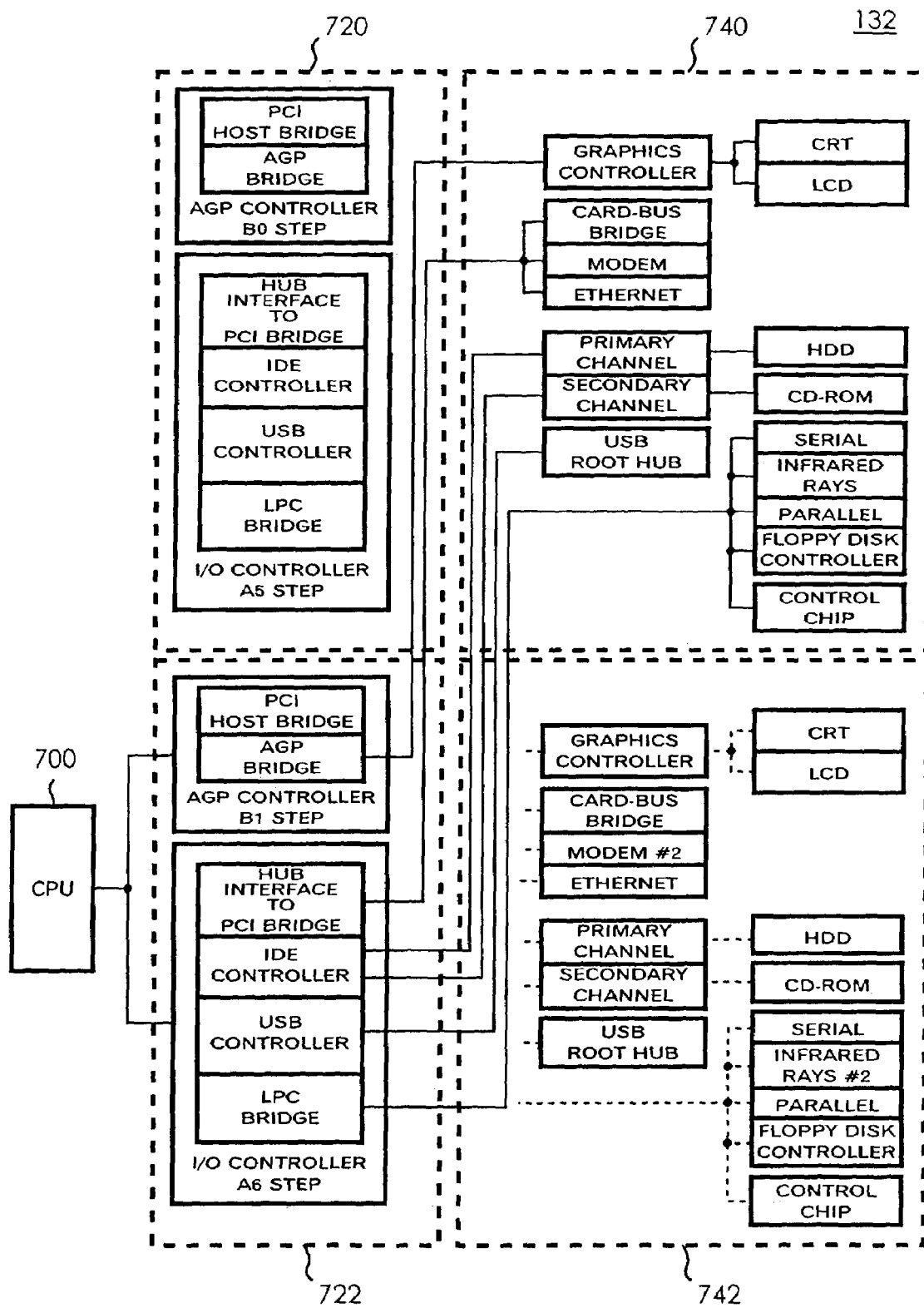
FIG. 7 is an example of registry information stored in the setting information database 132 after the registry information is changed by the changing section 150.

FIG. 7 shows an example of the registry information which the setting information database 132 stores therein after the registry information is changed by the changing section 150. The setting information database 132 has a CPU 700, a first layer of device group 720, a first layer of new device group 722, a second layer of device group 740, and a second layer of new device group 742. The first layer of device group 720, the first layer of new device group 722, the second layer of device group 740, and the second layer of new device group 742 shown in this figure are identical to the first layer of device group 720, the first layer of new device group 722, the second layer of device group 740, and the second layer of new device group 742 shown in FIG. 6, so that the descriptions of them will be omitted. Further, FIG. 7 shows a state that, in the setting information database 132 shown in FIG. 6, the second layer of device group 740 is managed as a lower level device in the first layer of new device group 722.

The condition deciding section 140 in FIG. 1 decides that the first layer of device group 720 and the first layer of new device group 722 obey the rule of the registry change rule database 142. Further, the condition deciding section 140 decides that the second layer of new device group 742 managed as a lower layer of the first layer of new device group 722 is identical to the second layer of device group 740. For example, if the identification information obtained from each of the second layer of device group 740 and the second layer of new device group 742 would be identical, the condition deciding section 140 decides that these device groups would be identical. That is, the condition deciding section 140 does not decide that, even if the main portion of the identification information for each of the second layer of device group 740 and the second layer of new device group 742 would be identical and only the revision would be different, the second layer of device group 740 and the second layer of new device group 742 are identical. By establishing a link to the registry information for the second layer of device group 740 in the first layer of new device group 722, the changing section 150 manages the registry information for the second layer of device group 740 as a lower layer of registry information for the first layer of new device group 722 and records it in the setting information database 132 (this result is shown in FIG. 7). Thus, the management apparatus 10 can change the first layer of device group 720 managed as a higher layer of the second layer of device group 740 with the first layer of new device group 722, without losing the existing registry information for the second layer of device group 740.

Figure 8:
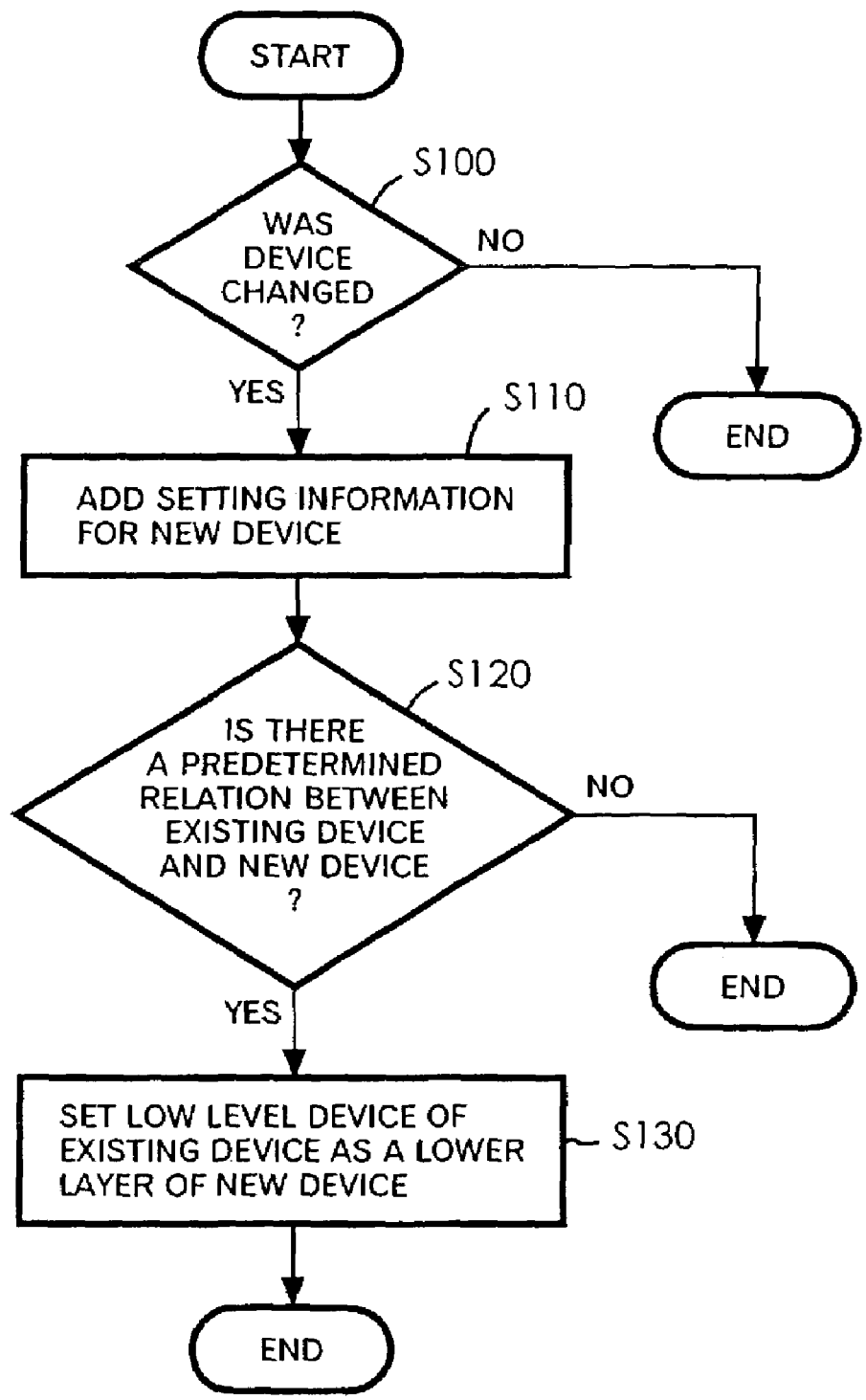
FIG. 8 is a flowchart showing the operations of the management apparatus 10.

FIG. 8 is a flowchart showing the operation of the management apparatus 10. The deciding section 100 decides whether or not an existing device has been changed with a new device (S100). If it would be decided that an existing device has been changed with a new device (S100:YES), the adding section 120 makes the registry information for the new device to be added to the setting information DB 132 (S110). Then, the condition deciding section 140 decides whether or not there would be a predetermined relationship between the existing device and the new device (S120). If there would be the predetermined relationship between the existing device and the new device (S120:YES), the changing section 150 manages the registry information for a low level device managed as a lower layer of the existing device, as a lower layer of registry information for the new device.

Figure 9:
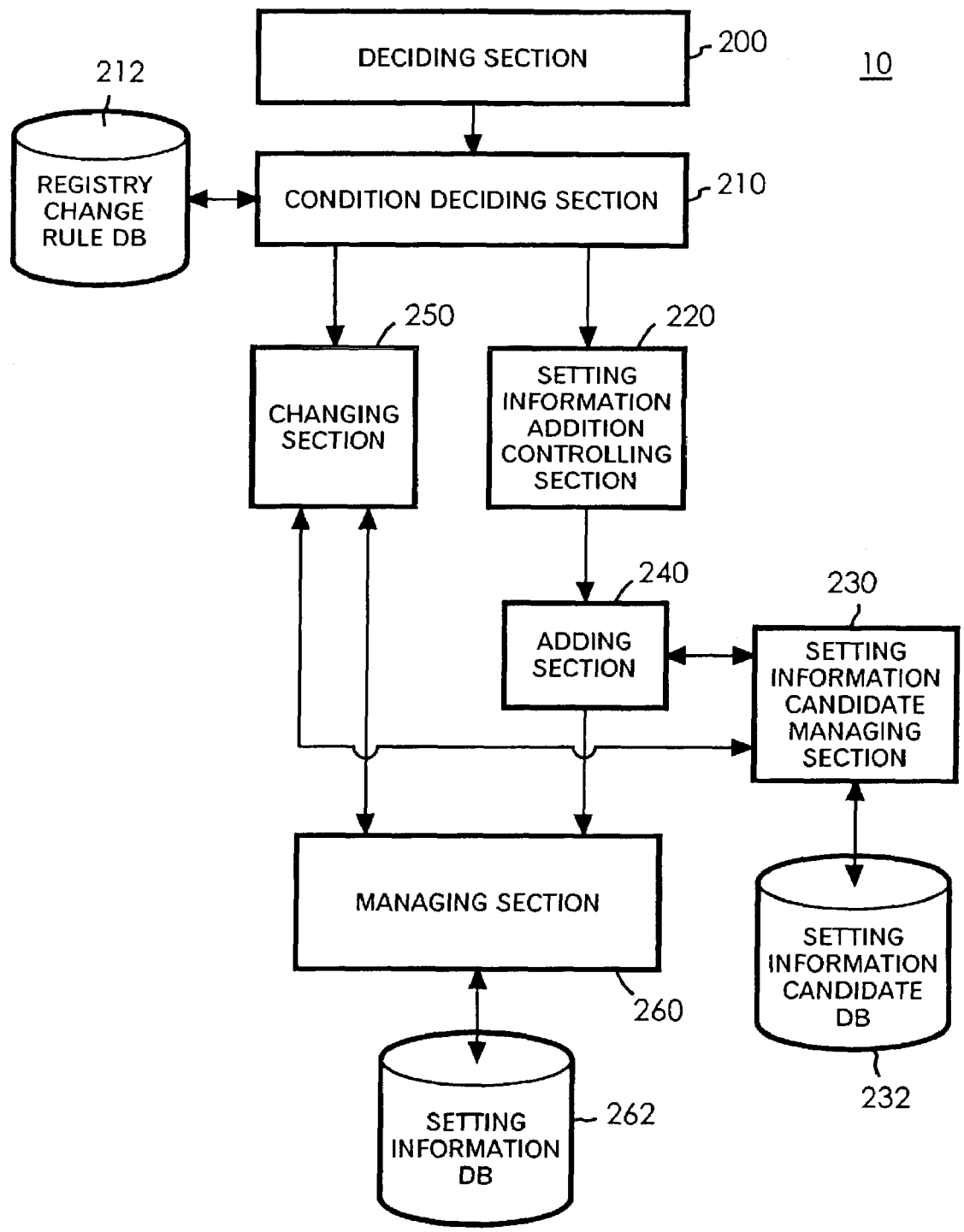
FIG. 9 is a functional block diagram of the management apparatus 10 in the first modified embodiment.

FIG. 9 shows a functional block diagram of the management apparatus 10 in the form of a first modified example. The management apparatus 10 is provided with a deciding section 200, a registry change rule database (DB) 212, a condition deciding section 210, a setting information addition controlling section 220, a setting information candidate database 232, an adding section 240, a changing section 250, a managing section 260, and a setting information database 262. The registry change rule database 212, the setting information candidate database 232, and the setting information database 262 are substantially same as the registry change rule database 142, the registry candidate database 112, and the setting information database 132, so that their descriptions will be omitted.

The deciding section 200 decides whether or not any existing devices would have been changed with a new device. Then, if any existing devices has been changed with a new device, the deciding section 200 sends the identification information for the existing device and the new device to the setting information addition controlling section 220 and the changing section 250.

The condition deciding section 210 receives the identification information for the existing device and the new device from the deciding section 200, and by referring to the registry change rule database 212, decides whether or not the existing device and the new device would have a predetermined relationship. If the condition deciding section 210 would decide that the existing device and the new device has a predetermined relationship, it sends a registry information succession direction to the changing section 250 in association with the identification information for the existing device and the new device. For example, the condition deciding section 210, when it decides that the existing device and the new device could be considered to be the same device on the basis of a rule recorded in the registry change rule database 212, sends them to the changing section 250. Also, the condition deciding section 210, if it would decide that the existing device and the new device have the predetermined relationship, sends to the setting information adding control section 220 an addition stop direction which is a direction of not adding the registry information for a device managed as a lower layer of the new device, in association with the identification information for the new device. On the other hand, the condition deciding section 210, if it would decide that the existing device and the new device would not have the predetermined relationship, sends the registry information addition direction to the setting information addition controlling section 220 in association with the identification information for the new device.

The setting information addition controlling section 220 receives an addition stop direction or a registry addition direction from the condition deciding section 210 in association with the identification information for the new device. The setting information addition controlling section 220, if it would receive the addition stop direction, can hold at least a portion of the registry information used to control the new device without adding it to the adding section 240, by not sending the identification information to the adding section 240. On the other hand, the setting information addition controlling section 220, if it would receive the registry addition direction, sends to the adding section 240 the identification information for the new device received in association with the involved direction.

The setting information candidate managing section 230 previously manages as the registry information a registry information for a device capable of being newly connected to the management apparatus 10, in association with the identification information for the involved device. The setting information candidate managing section 230 receives the identification information for the device from the adding section 240 or the changing section 250. Then, the setting information candidate managing section 230 specifies the registry information stored in the setting information candidate database 232 in association with the involved device and returns them to the adding section 240 or the changing section 250.

The adding section 240 receives the identification information for the new device from the setting information addition controlling section 220. Then, the adding section 240 sends the identification information for the new device to the setting information candidate managing section 230. Further, the adding section 240 receives the registry information for the new device from the setting information candidate managing section 230. Then, by sending the registry information for the new device to the managing section 260, the adding section 240 makes the managing section 260 add the registry information for the new device to the setting information DB 262.

The changing section 250 receives a registry information succession direction from the condition deciding section 210 in association with the identification information for the existing device and the new device. Then, by sending the identification information for the new device to the setting information candidate managing section 230, the changing section 250 receives a new registry information previously associated with the involved new device by the setting information candidate managing section 230. Further, the changing section 250 receives from the managing section 260 an existing registry information in association with the involved existing device by sending the identification information for the existing device. The changing section 250 directs the managing section 260 to add a portion of the existing registry information to the new registry information on the basis of the registry information succession direction. In this manner, the changing section 250 can make the registry information for the new device to be recorded in the setting information database 262, on the basis of the registry information for the existing device and the registry information associated with the new device provided by the setting information candidate managing section 230.

The managing section 260 sends the registry information to the changing section 250 in accordance with a request from the changing section 250. Also, the managing section 260 receives the registry information from the adding section 240 or the changing section 250. Then, the managing section 260 manages this registry information by recording it in the setting information database 262 using the layered structure.

Figure 10:
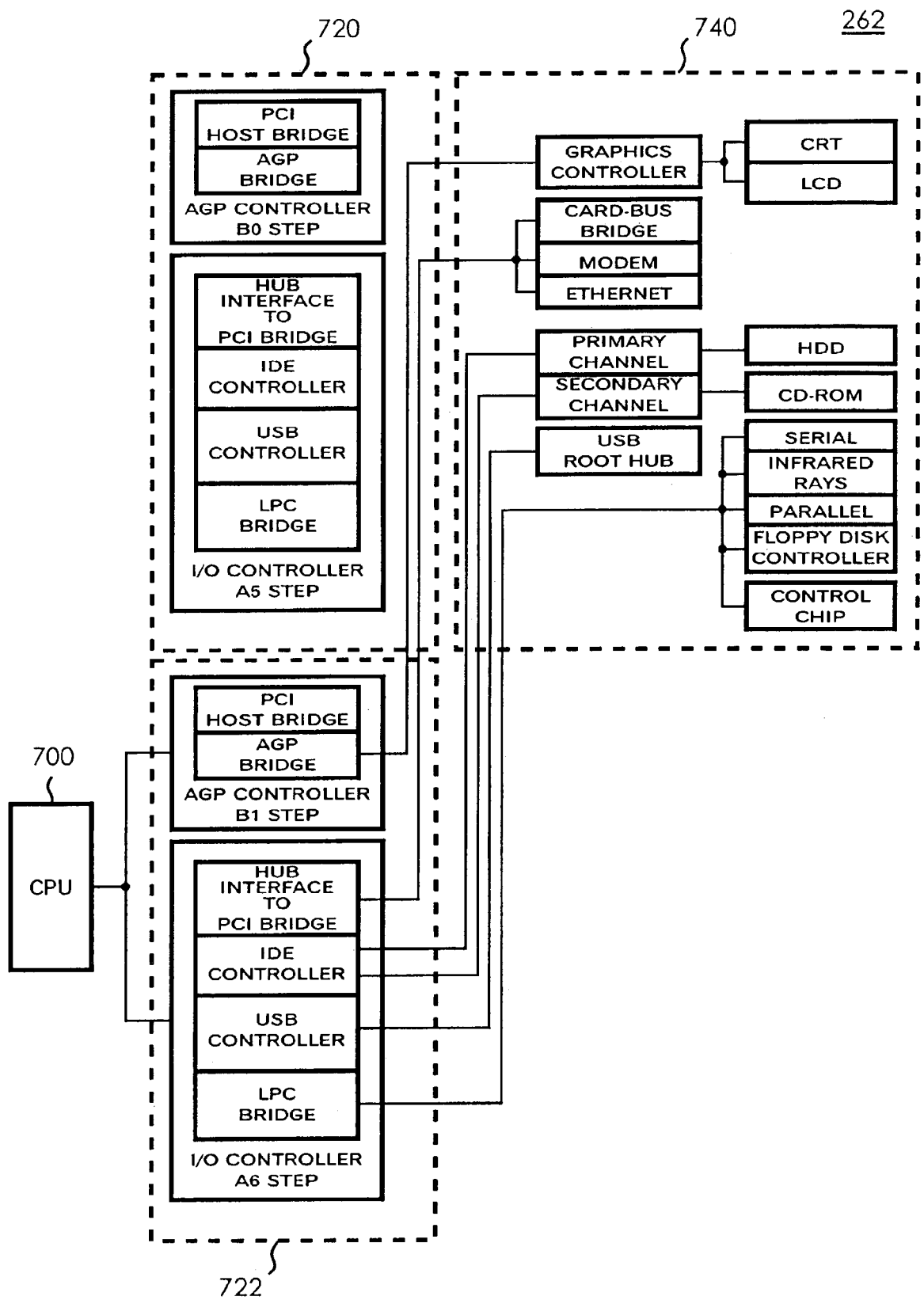
FIG. 10 is an example of registry information stored in the setting information database 262 after the registry information is changed by the changing section 150.

FIG. 10 shows an example of registry information which the setting information database 262 stores therein after the registry information is changed by the changing section 250. The changing section 250 generates the registry information of FIG. 10 as the result of newly adding the registry information for the AGP controller (B1 step) and the I/O controller (A6 step) to the setting information database 262, in addition to the registry information shown in FIG. 3. The setting information database 262 has a CPU 700, a first layer of device group 720, a first layer of new device group 722, and a second layer of device group 740. The first layer of device group 720 and the second layer of device group 740 shown in this figure are substantially same as the first layer of device group 720 and the second layer of device group 740 shown in FIG. 3, so that further descriptions on them will be omitted. The first layer of new device group 722 shown in this figure has a structure in which the B0 step and the A5 step showing a revision of the first layer of device group 720 has been changed with the B1 step and the A6 step, respectively.

Different from the setting information database 132 in FIG. 1, the setting information database 262 in this figure manages as a lower layer of registry information for the CPU 700 the registry information for the first layer of new device group 722, not for the first layer of device group 720. Also, the setting information database 262 manages the registry information for the second layer of device group 740 as a lower layer of registry information for the first layer of new device group 722. If a device in the first layer of device group 720 would be changed with a new high level device such as one in the first layer of new device group 722, the setting information adding control section 220 does not cause the new registry information to be added to a lower layer of registry information for the first layer of new device group 722. Accordingly, if a device in the first layer of device group 720 would be changed with a new high level device like one in the first layer of new device group 722, the changing section 250 can reuse, as a registry information for a low level device in the first layer of new device group 722, the setting information for a device in the second layer of device group 740 which has been managed as a lower level device in the first layer of device group 720.

Figure 11:
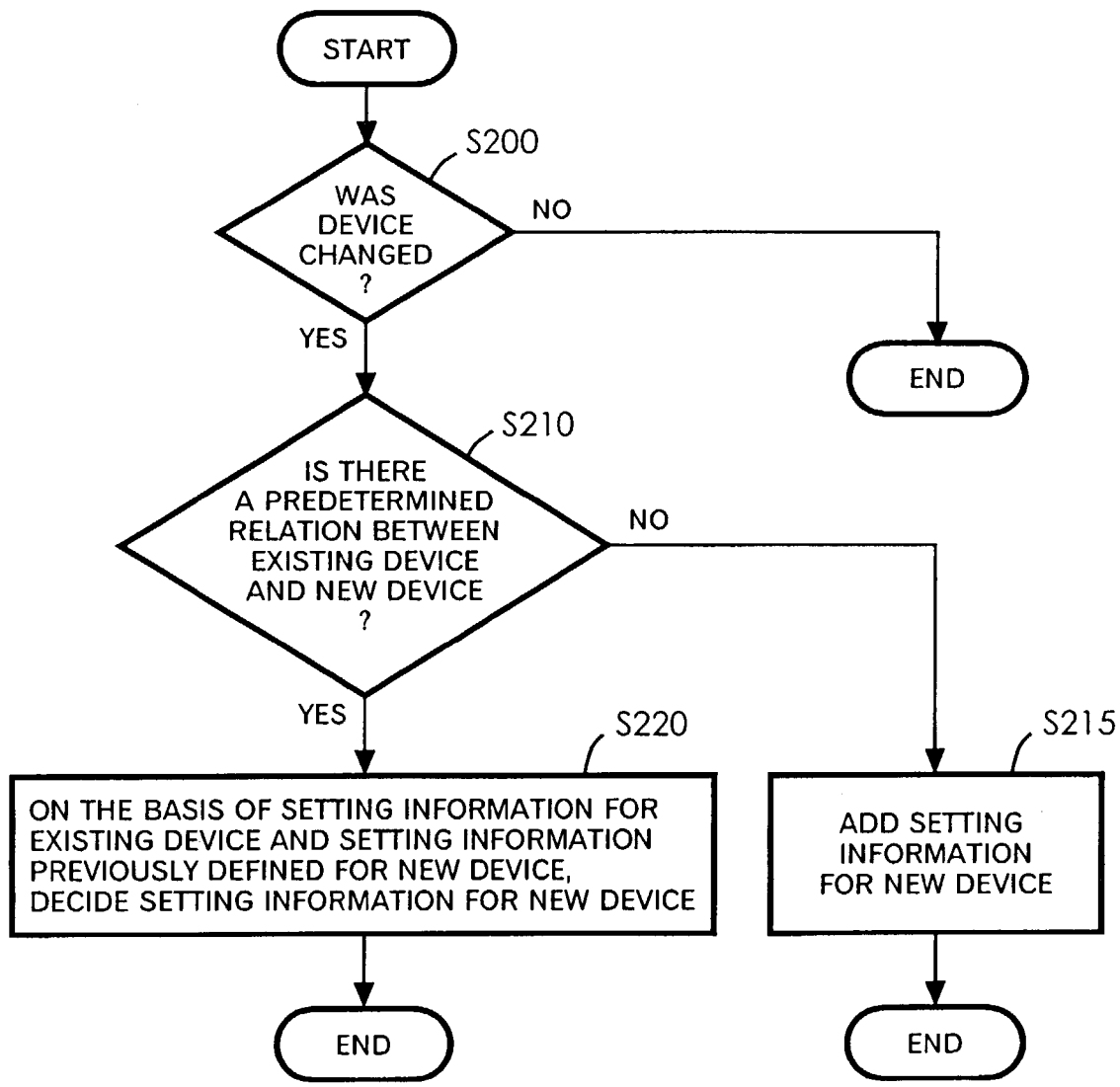
FIG. 11 is a flowchart showing the operations of the management apparatus 10 in the first modified embodiment.

FIG. 11 shows a flowchart indicating the operation of the management apparatus 10 in the first modified embodiment. The deciding section 200 decides whether or not an existing device would have been changed with a new device (S200). If the existing device has been changed with the new device (S200:YES), the condition deciding section 210 decides whether or not there is a predetermined relationship between the existing device and the new device (S210). If it would be decided that there is not the predetermined relationship between the existing device and the new device (S210:NO), the adding section 240 selects the registry information for the new device from the setting information candidate database 232 and causes it to be recorded in the setting information database 262. If it is decided that there is the predetermined relationship between the existing device and the new device (S210:YES), the changing section 250 decides the registry information for the new device on the basis of the setting information for the existing device and the registry information previously determined by the setting information candidate managing section 230, and causes it to be recorded in the setting information database 262 (S220).

Figure 12:
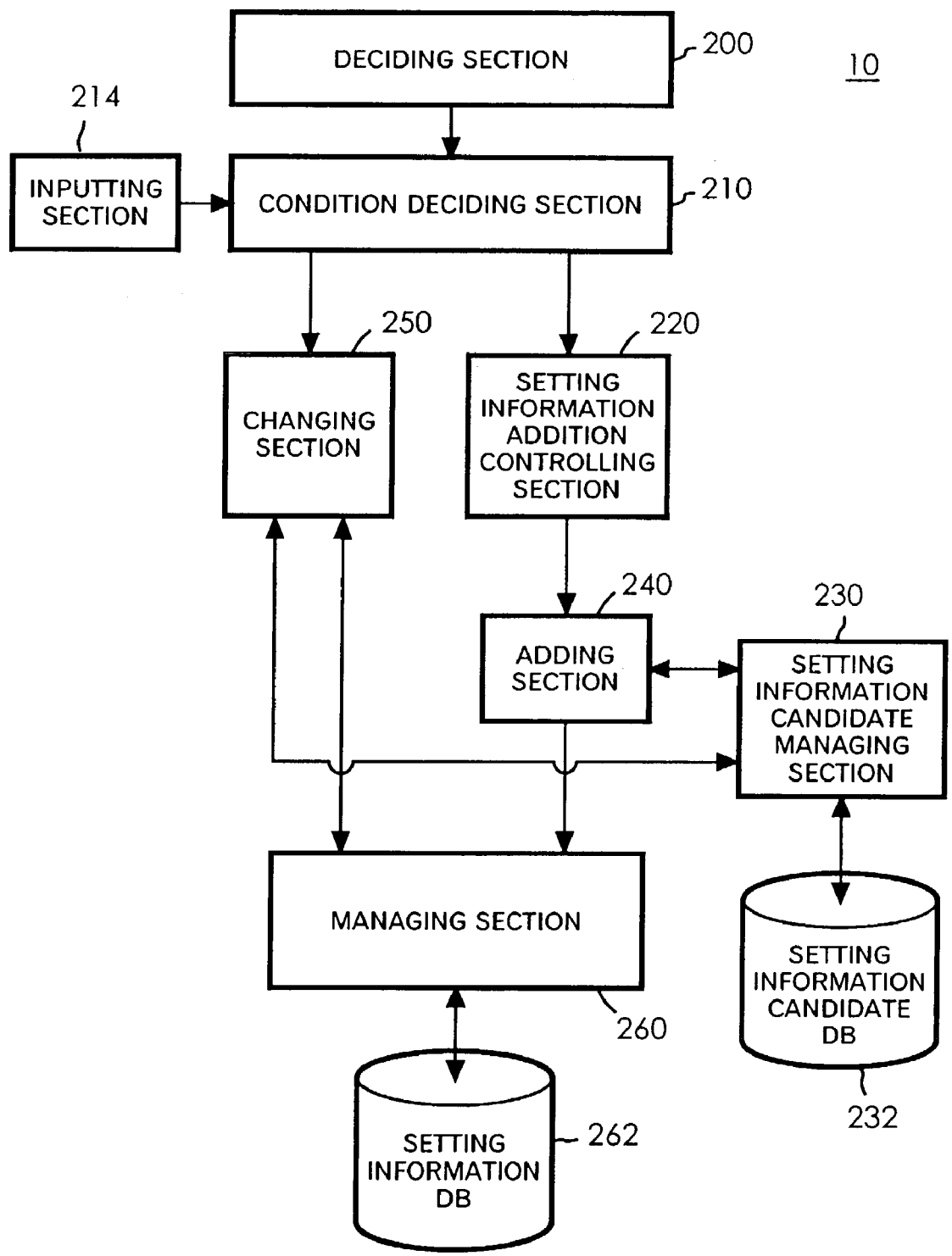
FIG. 12 is a functional block diagram of the management apparatus 10 in the second modified embodiment.

FIG. 12 shows a functional block diagram of the management apparatus 10 in the second modified embodiment. The management apparatus 10 in this figure has such a structure that the registry change rule database 212 is deleted from the management apparatus 10 in FIG. 9 and newly provided with an inputting section 214. In this figure, the structure except for the condition deciding section 210 and the inputting section 214 is substantially the same as the structure of the management apparatus 10 in FIG. 9, so that further descriptions will be omitted.

The inputting section 214 receives from the condition deciding section 210 the identification information for the existing device, the identification information for the new device, and a command or direction for prompting the user for input. Then, by presenting to the user the identification information for the existing device and the identification information for the new device, the inputting section 214 makes the user input whether or not there would be a predetermined relationship between these two devices. Then, the inputting section 214 sends this input to the condition deciding section 210.

The condition deciding section 210 in this figure, when it receives the identification information for the existing device and the new device from the deciding section 200, sends to the inputting section 214 these information's and a direction of prompting the user for input. Then, on the basis of the input from the inputting section 214, it is decided whether or not the existing device and the new device would have a predetermined relationship between them. If it is decided that the existing device and the new device have said predetermined relationship, the condition deciding section 210 sends the registry information succession direction to the changing section 250 in association with the identification information for the existing device and the new device. For example, the condition deciding section 210, when it decides that the existing device and the new device could be considered to be the identical device on the basis of the rule recorded in the registry change rule database 212, sends said direction to the changing section 250. Also, the condition deciding section 210, if it decides that the existing device and the new device have the predetermined relationship, sends to the setting information addition controlling section 220 the addition stop direction which is a direction of not adding the registry information for the device managed as a lower layer of the new device, in association with the identification information for the new device. On the other hand, the condition deciding section 210, if it would decide that the existing device and the new device do not have the predetermined relationship, sends the registry information addition direction to the setting information addition controlling section 220 in association with the identification information for the new device.

Figure 13:
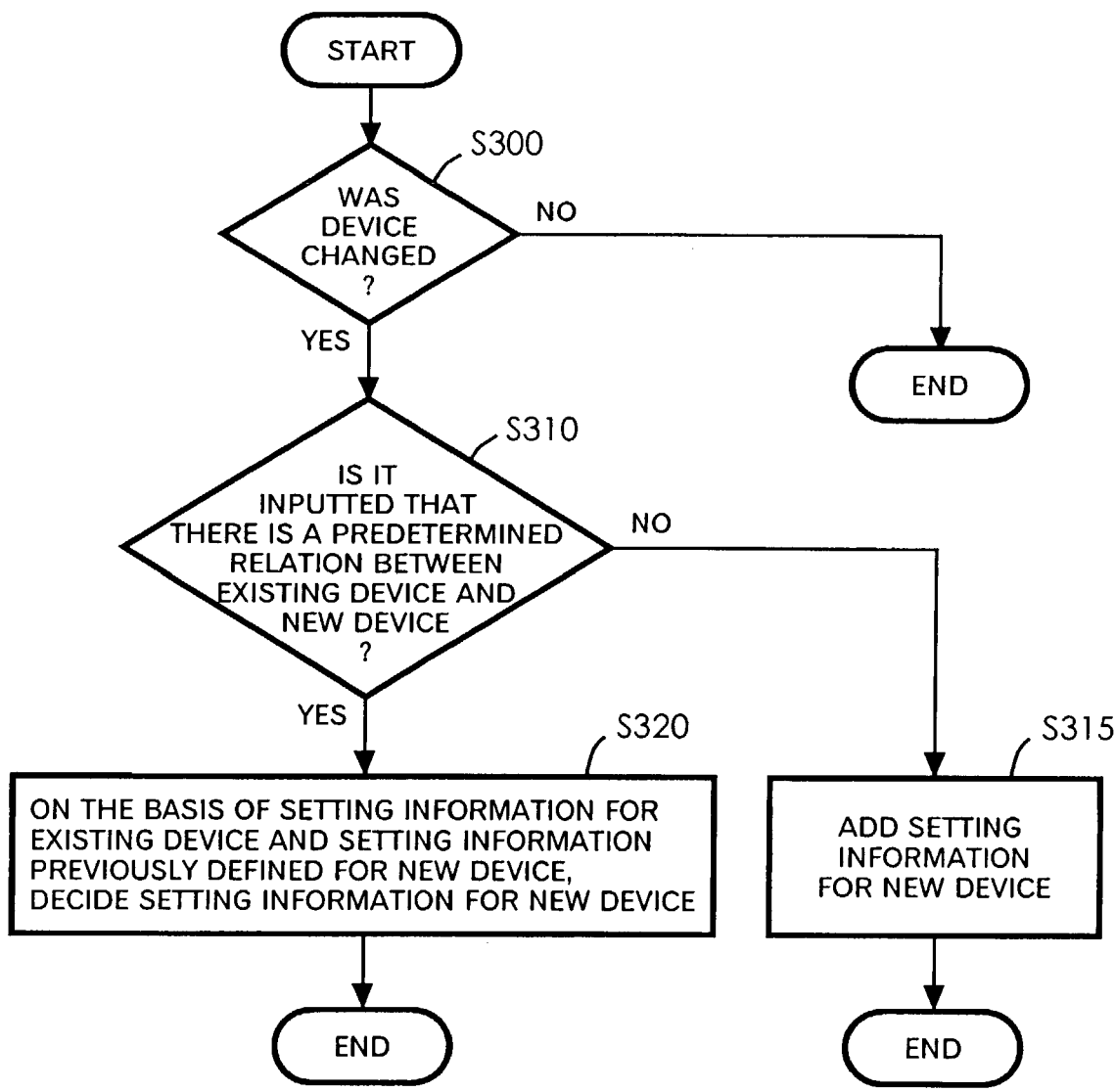
FIG. 13 is a flowchart showing the operations of the management apparatus 10 in the second modified embodiment.

FIG. 13 is a flowchart showing the operation of the management apparatus 10 in the second modified embodiment. The operations of S300, S315, and S320 in the figure are substantially same as those operations of S200, S215, and S220, so that their descriptions will be omitted. If it would be decided that an existing device has been changed with a new device (S300:YES), the condition deciding section 210 decides on the basis of the user's input whether or not there would be a predetermined relationship between the existing device and the new device (S310). As in this manner, the management apparatus 10 in the present modified embodiment can decide whether or not there would be the relationship between the existing device and the new device. Accordingly, the management apparatus 10 can make a decision of whether or not the registry information for the existing device could be succeeded and a decision of whether or not the registry information for the low level device having been managed as a lower layer of the existing device could be reused as a registry information for a lower layer of the new device (S320).

Figure 14:
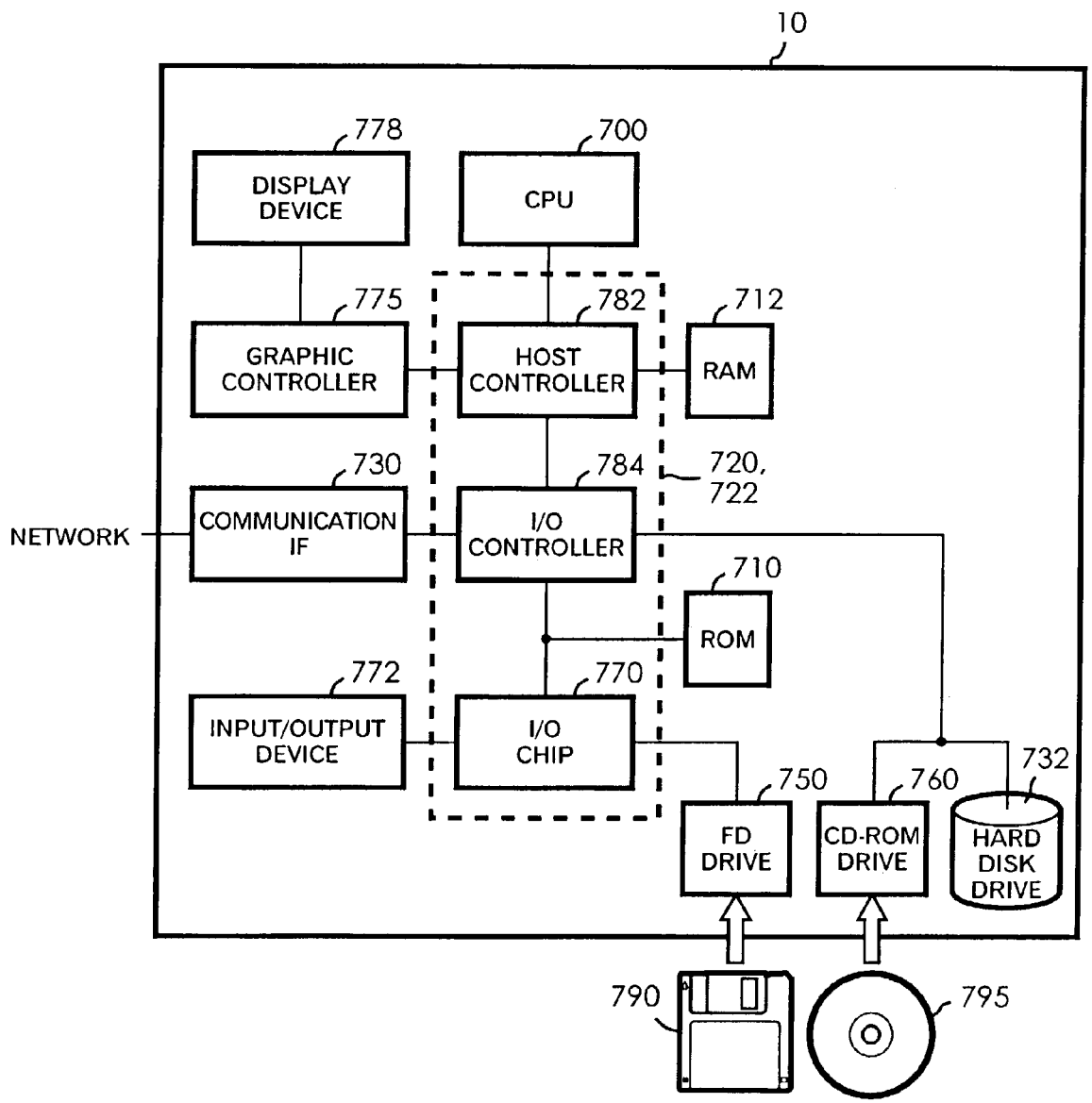
FIG. 14 is an example of the hardware structure of the management apparatus 10 in the above disclosed embodiments and their modifications.

FIG. 14 shows an example of the hardware structure of the management apparatus 10 in the embodiments and their modifications disclosed above. The management apparatus 10 of the present embodiment is provided with a CPU peripheral section having a display device 778, a CPU 700, a RAM 712 and a graphic controller 775 which are connected to each other by a host controller 782, an input/output section having a communication interface (IF) 730, a hard disk drive 732 and CD-ROM drive 760 which are connected by an input/output (I/O) controller 784, and a legacy input/output section having a ROM 710, a floppy disk (FD) drive 750, an input/output device 772 and an input/output (I/O) chip 770 which are connected to the input/output controller 784.

The host controller 782 connects the RAM 712, the CPU 700 accessing the RAM 712 at a high transfer rate, and the graphic controller 775. The CPU 700 operates on the basis of the programs stored in the ROM 710 and RAM 712, and performs the control of each section. The graphic controller 775 obtains an image data which the CPU 700 and others generate on the frame buffer provided in the RAM 712, and causes it to be displayed on the display device 778. Instead of this, the graphic controller 775 may include a buffer frame inside for storing the image data generated by the CPU 700 or the like.

The input/output controller 784 connects the host controller 782 to the communication interface 730, the hard disk drive 732 and the CD-ROM drive 760 which are a relatively high speed input/output device. The communication interface 730 communicates with the other device through a network. The hard disk drive 732 stores programs and data used by the management apparatus 10. The CD-ROM drive 760 reads programs or data from the CD-ROM 795 and provides them to the input/output chip 770 through the RAM 712.

Further, the input/output controller 784 is connected to the ROM 710 and a relatively low speed input/output device like the floppy disk drive 750, the input/output chip 770 and so on. ROM 710 stores the boot program executed by the CPU 700 at the startup of the management apparatus 10, and other programs dependent on the hardware of the management apparatus 10 or the like. The floppy disk drive 750 reads programs or data from the floppy disk 790 and provides them to the input/output chip 770 to store in the RAM 712. The input/output chip 770 connects floppy disk 790 or each kind of input/output devices, for example, through the parallel port, the serial port, the keyboard port, the mouse port or the like. Also, the input/output chip 770 receives the data corresponding to the user's input from the operating position reading section (not shown), and provides it to the program to be executed on the CPU 700. Further, the input/output chip 770 sends to the CPU 700 the programs or data provided from the floppy disk drive 750 or the CD-ROM drive 760.

A computer program realizing the management apparatus 10 comprises a deciding module, a condition deciding module, a setting information addition controlling module, a setting information candidate managing module, an adding module, a changing module, a managing module, an inputting module, and a registry candidate managing module. These modules makes a computer realize a deciding function, a condition deciding function, a setting information addition controlling function, a setting information candidate managing function, an adding function, a changing function, an inputting function and a registry managing function by causing the management apparatus 10 to perform as the deciding section 100, the registry candidate managing section 110, the adding section 120, the managing section 130, the condition deciding section 140, the changing section 150, the deciding section 200, the condition deciding section 210, the inputting section 214, the setting information addition controlling section 220, the setting information candidate managing section 230, the adding section 240, the changing section 250, and the managing section 260.

The computer programs provided to the management apparatus 10 are provided by users in a form of being stored in the recording media of the floppy disk 790, the CD-ROM 795, the IC card (not shown) or the like. The involved computer programs are read out of the recording media, installed in the management apparatus 10 through the input/output chip 770, and executed in the management apparatus 10.

The computer program or module disclosed above may be stored in the outside storage media. As the storage media, it is possible to use an optical recording media such as DVD, PD or the like, a magneto optical recording media such as MD or the like, and a semiconductor memory such as IC card or the like. Also, it is possible to use as the recording media a recording device of the hard disk, the RAM or the like provided in a server system connected to the private communication network or the Internet. Also, these recording media may further record data as shown in FIG. 15.

Figure 15:
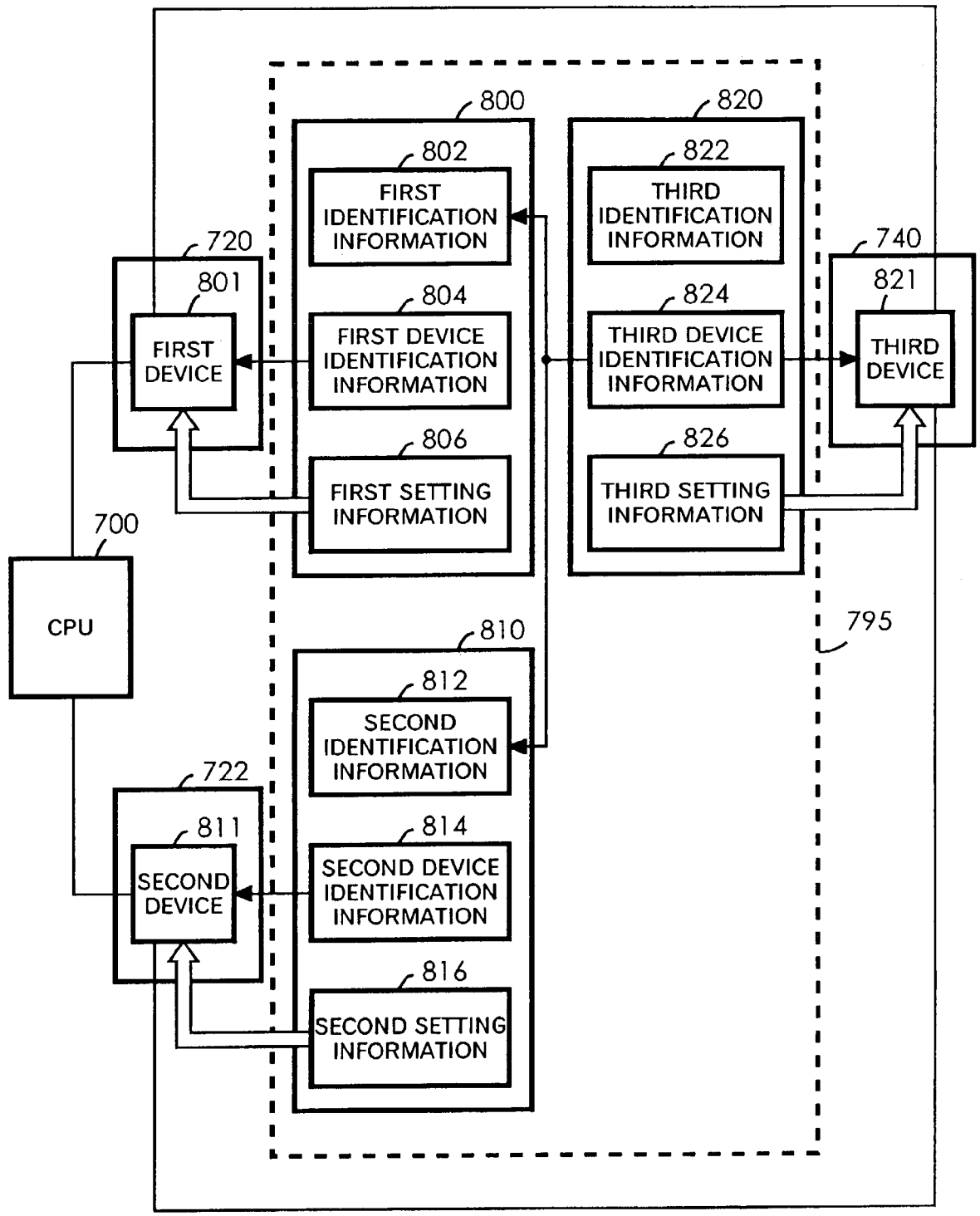
FIG. 15 is an example of the data recording media recorded by the management apparatus 10.

FIG. 15 shows an example of the data recording media 795 recorded by the management apparatus 10. The data recording media 795 comprises a first information recording area 800 for recording the setting information for a first device 801, a second information recording area 810 for recording the setting information for a second device 811, and a third information recording area 820 for recording the setting information for a third device 821. The first device 801 is, for example, one device in the first layer of device group 720. Also, the second device 811 may be one device in the first layer of new device group 722. Also, the third device 821 may be one device in the second layer of device group 740.

The first information recording area 800 has a first setting information recording area 806 which records the setting information for controlling the first device 801 which is an existing device connected to the CPU 700, a first device identification information recording area 804 which records the information identifying the first layer of device group 720, and a first identification information recording area 802 which records the information identifying the first information recording area 800.

The second information recording area 810 has a second setting information recording area 816 which records the setting information for controlling the second device 811 which is a new device connected to the CPU 700, a second device identification information recording area 814 which records the information identifying the first layer of new device group 722, and a second identification information recording area 812 which records the information identifying the second information recording area 810.

The third information recording area 820 has a third setting information recording area 826 which records the setting information for controlling a device in the second layer of device group 740 which is the third device 821 connected to the CPU 700 through the first layer of device group 720 or the first layer of new device group 722, a third device identification information recording area 824 which records the information identifying the second layer of device group 740, and a third identification information recording area 822 which records the information identifying the third information recording area 820.

The first identification information recording area 802 has the same identification information as the second identification information recording area 812. Also, the third device identification information recording area 824 includes this same identification information. The identification information (for example, the first identification information) is the value of a variable of the parent ID Prefix used for registry management in the Microsoft's Windows or the like. That is, both of the identification information recording area 802 and the second identification information recording area 812 have the same parent ID Prefix. Also, the third device identification information recording area 824 includes this parent ID Prefix.

As disclosed above, by controlling a device using the data recording media 795, it is possible for a computer to previously determine the setting information for controlling devices (for example, the first device 801 or the second device 811) which are dependent upon a certain device (for example, the third device) and are used exclusive of each other. Accordingly, in a situation that the changing from the first device 801 to the second device 811 or from the second device 811 to the first device 801 would be made, the data recording media 795 could be possible to control these devices without imposing the setting change on users.

As shown above, if an existing device would be changed with a new device, the management apparatus 10 and the data recording media 795 recorded by the management apparatus 10 could make the new device succeed a portion of the registry information in the existing device. Accordingly, the management apparatus 10 and the data recording media 795 can cause the registry information for a low level device managed as a lower layer of the existing device to be managed as a lower layer of registry information for the new device. Accordingly, the management apparatus 10 and the data recording media 795 can cause the registry information for the existing device or the registry information for a lower layer of the existing device to be reused. Therefore, the management apparatus 10 and the data recording media 795 can reduce the load on computers for changing the devices or the load on users.

In the drawings and specifications there has been set forth a preferred embodiment of the invention and, although specific terms are used, the description thus given uses terminology in a generic and descriptive sense only and not for purposes of limitation. While the present invention has been described with respect to the embodiment of the invention, the technical scope of the present invention is not limited to the described embodiment. Various changes and modifications may be made in the described embodiment. As is apparent from the description in the appended claims, modes of the present invention characterized by such changes and modifications are also included in the technical scope of the invention.

We claim as our invention:

1. A computer program product residing on a computer usable medium for managing a plurality of devices connected to a computer, said computer program product comprising:
    program code means for managing setting information associated with each of said plurality of devices by recording said setting information in a setting information database using a layered structure;
    program code means for adding setting information for a new device to said setting information database when an existing device is replacing by said new device;
    program code means for determining whether or not said existing device and said new device have a predetermined relationship, in response to a user request for managing setting information of a low level device of said existing device; and
    program code means for changing setting information for said low level device, from previously being managed as a lower layer of said existing device to being managed as a lower layer of said new device and for recording said changed setting information in said setting information database, in response to a determination that said existing device and said new device have a predetermined relationship.

2. The computer program product of claim 1, wherein said computer program product further includes
    program code means for determining whether or not a device detected as a lower layer of said new device is identical to said existing low level device; and
    program code means for managing setting information for said existing low level device as a lower layer of setting information for said new device and for recording said new setting information in said setting information database in response to a determination that a device managed as a lower layer of said new device is identical to said existing low level device.

3. The computer program product of claim 1, wherein said program code means for changing further includes program code means for establishing a link to said setting information for said existing low level device in said setting information for said new device and for recording said link to said setting information in said setting information database.

4. The computer program product of claim 1, wherein said setting information is registry information that an operating system of said computer utilizes to control said plurality of devices.

5. The computer program product of claim 1, wherein
    said existing device and said new device are interface devices for controlling an interface connecting between said computer and said low level device; and
    said low level device is a device connected to said interface.

6. A method for managing a plurality of devices connected to a computer, said method comprising:
- managing setting information associated with each of said plurality of devices by recording said setting information in a setting information database using a layered structure;
- adding setting information for a new device to said setting information database when an existing device is replacing by said new device;
- determining whether or not said existing device and said new device have a predetermined relationship, in response to a user request for managing setting information of a low level device of said existing device; and
- changing setting information for said low level device from previously being managed as a lower layer of said existing device to being managed as a lower layer of said new device and for recording said changed setting information in said setting information database, in response to a determination that said existing device and said new device have a predetermined relationship.

7. The method of claim 6, wherein said method further includes
- determining whether or not a device detected as a lower layer of said new device is identical to said existing low level device; and
- managing setting information for said existing low level device as a lower layer of setting information for said new device and for recording said new setting information in said setting information database in response to a determination that a device managed as a lower layer of the new device is identical to said existing low level device.

8. The method of claim 6, wherein said changing further includes establishing a link to said setting information for said existing low level device in said setting information for said new device and for recording said link to said setting information in said setting information database.

9. The method of claim 6, wherein said setting information is registry information that an operating system of said computer utilizes to control said plurality of devices.

10. The method of claim 6, wherein
- said existing device and said new device are interface devices for controlling an interface connecting between said computer and said low level device; and
- said low level device is a device connected to said interface.

11. An apparatus for managing a plurality of devices connected to a computer, said apparatus comprising;
- means for managing setting information associated with each of said plurality of devices by recording said setting information in a setting information database using a layered structure;
- means for adding setting information for a new device to said setting information database when an existing device is replacing by said new device;
- means for determining whether or not said existing device and said new device have a predetermined relationship, in response to a user request for managing setting infonnation of a low level device of said existing device; and
- means for changing setting information for said low level device from previously being managed as a lower layer of said existing device to now being managed as a lower layer of said new device and for recording said changed setting information in said setting information database, in response to a determination that said existing device and said new device have a predetermined relationship.

12. The apparatus of claim 11, wherein said apparatus further includes
- means for determining whether or not a device detected as a lower layer of said new device is identical to said existing low level device; and
- means for managing setting information for said existing low level device as a lower layer of setting information for said new device and for recording said new setting information in said setting information database in response to a determination that a device managed as a lower layer of the new device is identical to said existing low level device.

13. The apparatus of claim 11, wherein said means for changing further includes means for establishing a link to said setting information for said existing low level device in said setting information for said new device and for recording said link to said setting information in said setting information database.

14. The apparatus of claim 11, wherein said setting information is registry information that an operating system of said computer utilizes to control said plurality of devices.

15. The apparatus of claim 11, wherein
- said existing device and said new device are interface devices for controlling an interface connecting between said computer and said low level device; and
- said low level device is a device connected to said interface.

* * * * *

UNITED STATES PATENT AND TRADEMARK OFFICE
CERTIFICATE OF CORRECTION

PATENT NO.        : 6,970,949 B2
APPLICATION NO. : 10/402558
DATED             : November 29, 2005
INVENTOR(S)       : Inui et al.

It is certified that error appears in the above-identified patent and that said Letters Patent is hereby corrected as shown below:

column 18, line 11, delete "infonnation" and insert --information--.

Signed and Sealed this

Twelfth Day of September, 2006

JON W. DUDAS
*Director of the United States Patent and Trademark Office*